(12) United States Patent
Corriher

(10) Patent No.: US 8,511,417 B2
(45) Date of Patent: *Aug. 20, 2013

(54) BRAKING SYSTEM FOR FRONT CASTER WHEELS OF A SELF-PROPELLED VEHICLE

(76) Inventor: Ted H. Corriher, Newton, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,544

(22) Filed: Dec. 7, 2011

(65) Prior Publication Data

US 2012/0167537 A1    Jul. 5, 2012

Related U.S. Application Data

(63) Continuation-in-part of application No. 12/619,532, filed on Nov. 16, 2009, now Pat. No. 8,083,020.

(60) Provisional application No. 61/115,652, filed on Nov. 18, 2008.

(51) Int. Cl.
*B62D 21/00* (2006.01)

(52) U.S. Cl.
USPC ............................................. 180/312; 280/86

(58) Field of Classification Search
USPC .................. 188/1.12; 180/210, 312; 74/491, 74/512; 56/14.7, 16.4 R, 16.7; 16/18 R; 280/86
See application file for complete search history.

(56) References Cited

U.S. PATENT DOCUMENTS

| | | | |
|---|---|---|---|
| 2,501,578 A | 3/1950 | Pointer | |
| 2,946,416 A | 7/1960 | Snoy | |
| 3,382,653 A * | 5/1968 | De Buigne | 56/12.9 |
| 3,592,299 A | 7/1971 | Erdmann | |
| 3,832,933 A | 9/1974 | Jablonsky | |
| 3,920,103 A | 11/1975 | Haraikawa | |
| 3,972,246 A | 8/1976 | Link | |
| 3,983,792 A | 10/1976 | Furtner | |
| 4,025,218 A | 5/1977 | Logan et al. | |
| 4,048,880 A | 9/1977 | Link | |
| 4,149,451 A | 4/1979 | Axelsson | |
| 4,317,324 A | 3/1982 | Malmberg et al. | |
| 4,329,092 A | 5/1982 | Ponitzsch et al. | |
| 4,410,194 A | 10/1983 | Steilen | |
| 4,594,030 A | 6/1986 | Weigel, Jr. | |
| 4,602,702 A | 7/1986 | Ohta et al. | |
| 4,793,447 A | 12/1988 | Taig et al. | |
| 4,998,320 A | 3/1991 | Lange | |
| 5,044,055 A | 9/1991 | Howarth et al. | |
| 5,085,280 A | 2/1992 | Rassieur | |
| 5,086,884 A | 2/1992 | Gordon et al. | |
| 5,107,730 A | 4/1992 | Muraki et al. | |
| 5,127,291 A | 7/1992 | Lothammer | |
| 5,161,650 A | 11/1992 | Taig | |
| 5,443,141 A | 8/1995 | Thiel | |
| 5,497,856 A | 3/1996 | Block et al. | |

(Continued)

*Primary Examiner* — Joseph Rocca
*Assistant Examiner* — Robert A Coker
(74) *Attorney, Agent, or Firm* — Muncy, Geissler, Olds & Lowe, PLLC

(57) ABSTRACT

A ride-on, self-propelled vehicle having front caster wheels, such as a zero-turn mower, includes a front brake system. The actuating power for the front brake pass through a spindle supporting the front caster wheel. In a preferred embodiment, a center shaft of each spindle or a concentric outer ring of a sleeve of each spindle passes a force from a brake actuator to a brake for the respective caster wheel. Actuation of the brake actuator moves a member into frictional contact with a portion of the front wheel or an object attached to the front wheel to applying a braking force.

4 Claims, 13 Drawing Sheets

(56) References Cited

U.S. PATENT DOCUMENTS

| | | | |
|---|---|---|---|
| 5,788,023 A | 8/1998 | Schoner et al. | |
| 5,915,504 A | 6/1999 | Doricht | |
| 5,984,031 A | 11/1999 | Velke et al. | |
| 6,105,349 A * | 8/2000 | Busboom et al. | 56/14.7 |
| 6,109,348 A | 8/2000 | Caraway | |
| 6,138,446 A | 10/2000 | Velke et al. | |
| 6,145,633 A | 11/2000 | Niederstadt et al. | |
| 6,192,666 B1 * | 2/2001 | Sugden et al. | 56/320.2 |
| 6,240,713 B1 | 6/2001 | Thomas | |
| 6,279,689 B1 | 8/2001 | Zemyan | |
| 6,460,661 B1 | 10/2002 | Heckmann | |
| 6,550,598 B2 | 4/2003 | Drennen | |
| 6,626,269 B2 | 9/2003 | Shaw et al. | |
| 6,865,775 B2 * | 3/2005 | Ganance | 16/35 R |
| 7,178,645 B2 | 2/2007 | Maehara | |
| 7,344,341 B2 | 3/2008 | Shemeta | |
| 8,083,020 B2 * | 12/2011 | Corriher | 180/312 |
| 2004/0000130 A1 * | 1/2004 | Bartel | 56/11.3 |
| 2004/0020179 A1 * | 2/2004 | Reincke | 56/16.7 |
| 2006/0175098 A1 | 8/2006 | Sutherland | |
| 2007/0163790 A1 | 7/2007 | Ryder et al. | |
| 2007/0261381 A1 | 11/2007 | Collins | |
| 2008/0264026 A1 | 10/2008 | Ishii et al. | |
| 2009/0000839 A1 * | 1/2009 | Ishii et al. | 180/65.5 |
| 2009/0078511 A1 | 3/2009 | Boyko | |

* cited by examiner

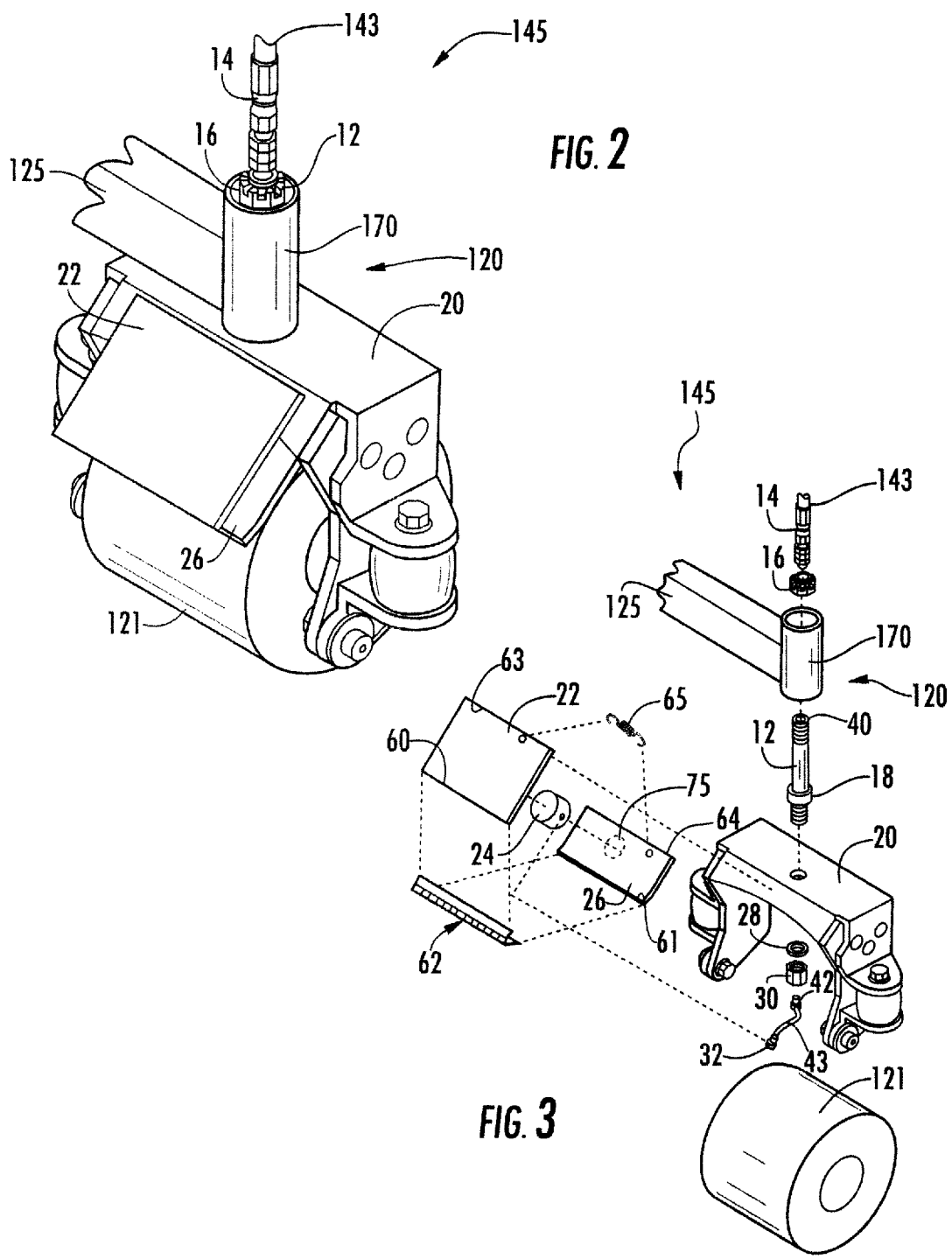

BRAKING SYSTEM FOR FRONT CASTER WHEELS OF A SELF-PROPELLED VEHICLE

This application is a continuation-in-part of U.S. Utility application Ser. No. 12/619,532, filed Nov. 16, 2009, now U.S. Pat. No. 8,083,020 which claims the benefit of U.S. Provisional Application No. 61/115,652, filed Nov. 18, 2008, the entire contents of which are herein incorporated by reference.

BACKGROUND OF THE INVENTION

1. Field of the Invention

The present invention relates to a braking system for front caster-style wheels of a self-propelled vehicle. More particularly, the present invention relates to a braking system which permits an operator of a self-propelled vehicle to selectively brake front caster wheels, wherein the front wheels remain free to continuously rotate about a respective spindle axis.

2. Description of the Related Art

Self-propelled vehicles with front wheels of the caster-style are common in the background art. A caster wheel is meant to encompass wheels which are permitted to freely rotate three hundred sixty degrees many times in the same direction about a spindle, such as a wheel having an axle that is substantially horizontal, wherein the axle is mounted to a substantially vertical spindle. A common embodiment of such a self-propelled vehicle is a ride-on (sitting or standing), zero-turn mower, also referred to as a zero turning radius mower or ZTR mower. Another example of such a self-propelled vehicle is a ride-on, power scooter for the elderly or disabled.

Such self-propelled vehicles are highly valued by the driver, primarily because of their ability to easily navigate sharp turns (i.e., zero turns), which enhances a rider's ability to control the vehicle (e.g., mow grass more efficiently, maneuver through crowds or store aisles more accurately). The "zero turn" ability of the vehicle is directly related to the front wheels being of the caster-style. Such self-propelled vehicles traditionally rely on the rear wheels for driving power, for steering (by controlling the drive speed and/or direction of rotation of the rear wheels independently), and for braking. Braking of the vehicle by using the rear wheels may be accomplished by disc or drum brakes, or more commonly by hydraulically controlling the drive system for the rear wheels.

SUMMARY OF THE INVENTION

The Applicant has appreciated drawbacks in the self-propelled vehicles of the background art. For example, the front wheels play no role in the braking system of the vehicle. As well-understood from the automotive arts, when a vehicle includes a braking system on both the front and the rear wheels, the stopping ability is greatly enhanced. Most of the stopping power of a four wheel braking system is attributed to the front wheels, as compared to the rear wheels, when the vehicle is traveling in the forward direction.

In a typical brake system, an electrical wire, hydraulic or pneumatic hose or mechanical linkage is connected to a brake device on the wheel. The wire, hose or linkage powers or signals the brake on the wheel to cause the brake to slow or stop rotation of the wheel. In zero-turn vehicles, the front caster wheels are free to rotate three hundred sixty degrees about a spindle in a same direction many times (usually an unlimited number of times). This presents an engineering challenge in that wires, hoses and/or linkages will be twisted about the vehicle framework supporting the spindle of the caster wheel. Hence, such wires, hoses and/or linkages may be damaged and/or prevent the free rotation of the caster wheel about the spindle. As such, zero-turn, self-propelled vehicles with front caster wheels, currently in production, have not enjoyed the improved braking performance attainable from a front braking system.

In the case of zero-turn mowers, numerous deaths and personal injuries have been attributed to a zero-turn mower sliding down an inclination and into harm's way (off of a retaining wall, into deep water, into traffic on a street, etc.). The sliding of the zero-turn mower can be caused by speed, angle of inclination, wet grass conditions, etc. Under many circumstances, the operator's full control of the rear drive wheels to stop their rotation and/or to reverse the direction of rotation of the rear drive wheels is insufficient to stop the forward sliding motion of the mower in time to avoid injury or death. See Applicant's web site at www.tedbrakes.com. It is believed that the inclusion of a front braking system, in accordance with the present invention, would greatly reduce the number of deaths and personal injuries in the field of zero-turn mowers.

It is an object of the present invention to address one or more of the drawbacks discussed above and/or Applicants' appreciated needs in the art, such as improving the safety of zero-turn vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 2 is a close up view of a spindle/caster wheel assembly of the mower of FIG. 1, constructed in accordance with a first embodiment;

FIG. 3 is an exploded view of the spindle/caster wheel assembly of FIG. 2, illustrating a drag brake system;

DETAILED DESCRIPTION OF THE INVENTION

Figure 1:
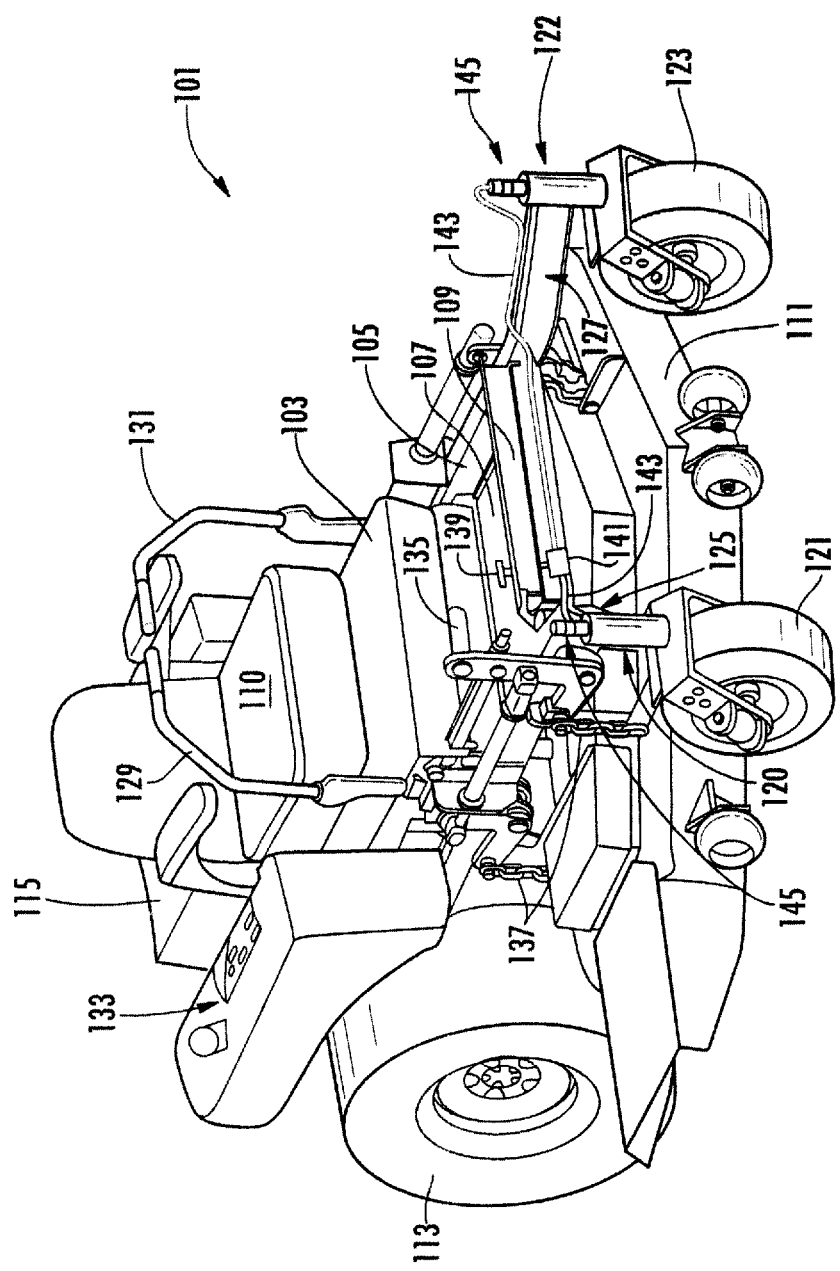
FIG. 1 is a perspective view of a zero-turn mower including a front brake system, in accordance with a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a zero-turn mower 101 having a front brake system, in accordance with a first embodiment of the present invention. Except for the front braking system of the present invention, the zero-turn mower 101 may be constructed in accordance with the prior art versions of such mowers wherein a rider sits or stands. In general, such a zero-turn mower 101 includes a frame formed of interconnected tubular steel members and/or plates, such as members/plates 103, 105, 107 and 109. A rider's platform 110 is attached to the frame. In a preferred embodiment the rider's platform 110 includes a seat for a rider. However in other embodiments, the rider's platform 110 may include a plate mounted to a rear of the frame where a rider stands. A mowing deck 111 is attached to the frame. The mowing deck 111 typically includes one or more blades therein.

An engine 115 is attached to a rear portion of the frame. Two drive wheels 113 are also attached to the rear portion of the frame. First and second caster wheels 121 and 123 are attached to a front portion of the frame via first and second spindles 120 and 122, respectively, at distal ends of first and second frame extensions 125 and 127, respectively. Both of the first and second caster wheels 121 and 123 have an axle that is substantially horizontal, wherein the axle is mounted to a substantially vertical spindle 120 or 122. Both spindles 120 and 122 enable the caster wheels 121 and 123 to rotate about the substantially vertical axis of their respective spindle by three hundred sixty degrees. In a more preferred embodiment, both of the first and second caster wheels 121 and 123 are capable of rotating about the vertical axis (passing through the supporting first and second spindles 120 and 122) three hundred sixty degrees multiple to infinite times in either a clockwise direction or a counter-clockwise direction.

In operation, the engine 115 has an ability to rotate the rear wheels 113 to impart movement/steering to the mower 101 and has an ability to rotate the blade or blades of the mowing deck 111 for cutting grass. The operator controls the power transmission from the engine to the rear wheels 113 independently, via first and second control arms 129 and 131. The operator controls the power transmission from the engine 115 to the blade or blades of the mowing deck 111 via a control panel 133. The operator elevates the height of the mowing deck 111 via a first foot pedal 135, which lifts the mowing deck 111 via chains 137.

Figure 1A:
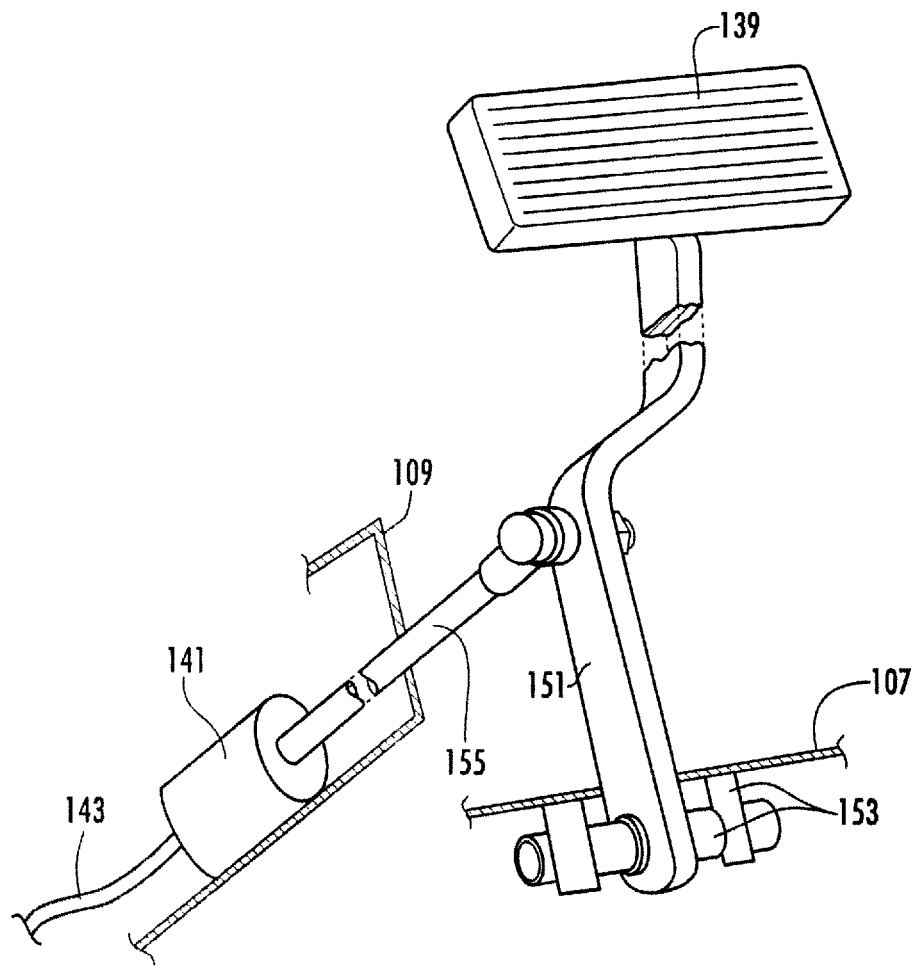
FIG. 1A is a perspective view in partial cross section, illustrating a foot pedal embodiment of a manual actuator.

In a first embodiment of the present invention, a second foot pedal 139 is attached to the frame of the zero-turn mower 101, as shown in greater detail in the close-up view of FIG. 1A. If the operator depresses the second foot pedal 139, a force is applied to a first mechanism 141 which communicates via at least one link 143 with at least one second mechanism 145. In the first embodiment of the invention, there are two second mechanisms 145 in the form of brake assemblies to slow or arrest rotation of the first and second front caster wheels 121 and 123. The first mechanism 141 for sensing the movement of the second foot pedal 139 may take many forms. For example, the first mechanism 141 may be a master cylinder for pressurizing hydraulic fluid in a hydraulic hose (a form of the link 143) attached thereto, a release valve for controllably releasing a store of pneumatic pressure to an air hose (a form of the link 143) attached thereto, a controller (e.g., switch, variable resistor or microprocessor) for changing the characteristics of a current in a wire (a form of the link 143) attached thereto, or a linkage to impart a movement to a cable or further linkage (a form of the link 143) attached thereto.

In the first embodiment of FIGS. 1 and 1A, the second foot pedal 139, includes a support bar 151 which is pivotably attached via a hinge 153 to a frame member (e.g., plate 107). The second foot pedal 139 also includes a push rod 155, whereby press and release movement of the second foot pedal 139 causes the push rod 155 to move in a substantially reciprocal fashion. The push rod 155 enters the first mechanism 141, which in the first embodiment of the invention is a master cylinder. The first mechanism 141 pressurizes hydraulic fluid in a hydraulic hose, forming the link 143.

Figure 1B:
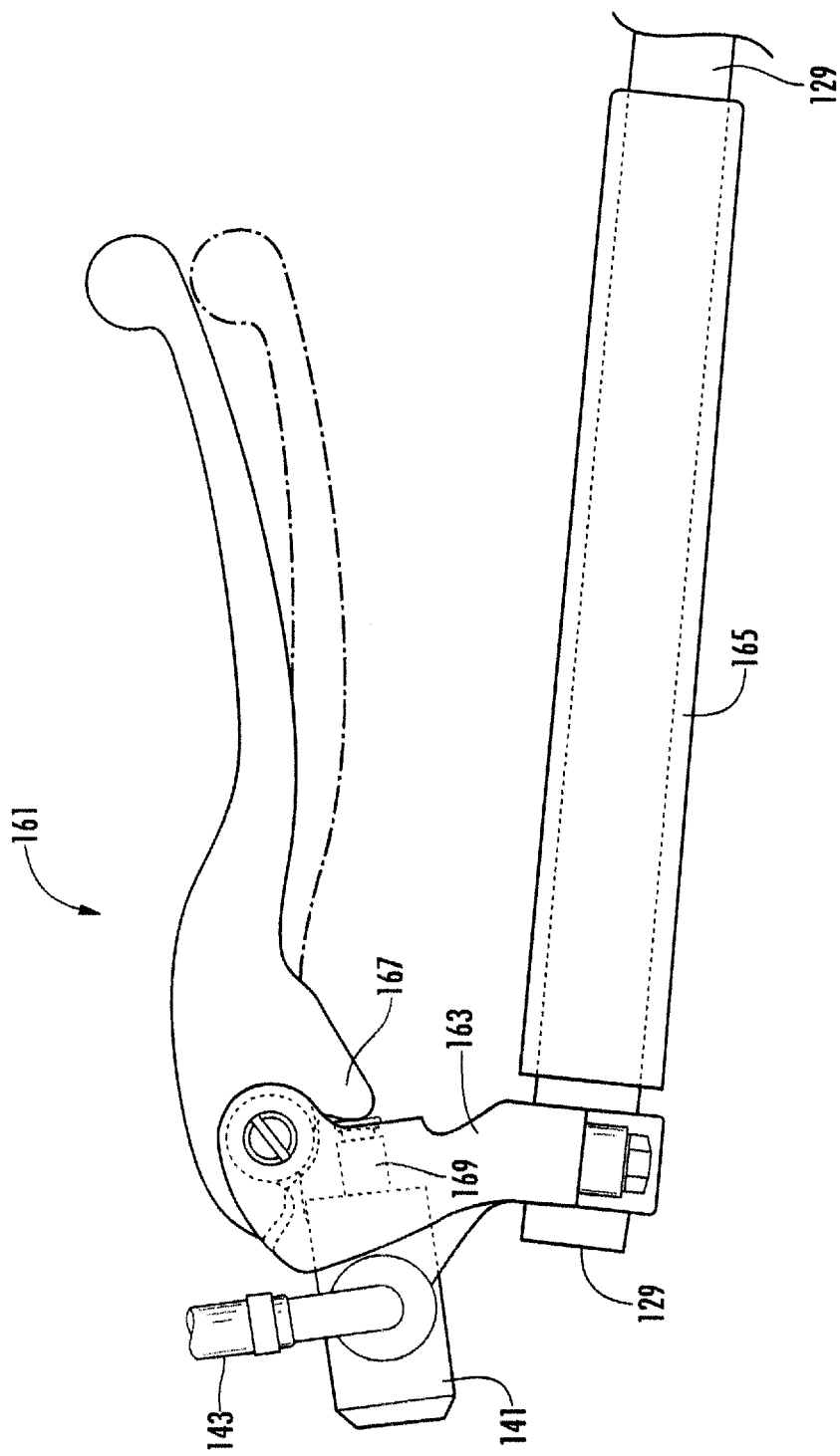
FIG. 1B is an overhead view in partial transparency, illustrating a hand lever embodiment of a manual actuator.

Although the master cylinder forming the first mechanism 141 in FIGS. 1 and 1A has been illustrated as being activated by a second foot pedal 139, other types of manual actuators may be employed in the present invention. For example, FIG. 1B illustrates a hand actuator 161. The hand actuator 161 may be substituted for the second foot pedal 139 of FIG. 1A.

The hand actuator 161 is pivotably attached to a bracket 163, which is fixed to a distal end of the first control arm 129. A foam or rubber grip 165 may encircle the first control arm 129. When an operator, pulls the hand actuator 161 toward the rubber grip 165, the hand actuator 161 pivots to the position indicated by dashed lines in FIG. 1B. An abutment 167 of the hand actuator 161 presses a short push rod 169 and causes the first mechanism 141 (i.e., the master cylinder) to pressurize hydraulic fluid in the link 143 (i.e., attached hydraulic hose).

FIG. 2 is a close-up, perspective view of the first spindle 120 and first caster wheel 121 of FIG. 1. FIG. 3 is an exploded view of the first spindle 120 and first caster wheel 121 of FIGS. 1 and 2. FIGS. 2 and 3 better illustrate the component parts of the second mechanism 145, which form a brake assembly, in accordance with the first embodiment of the present invention. The structure of the first and second caster wheels 121 and 123, first and second spindles 120 and 122, and the second mechanisms 145 are either identical or mirror symmetrical. Therefore, only the construction of the first caster wheel 121, the first spindle 120 and the attached second mechanism 145 will be detailed below.

At the distal end of the first frame extension 125, there is rigidly and directly attached a spindle sleeve 170. For example, the spindle sleeve 170 may be welded to the distal end of the first frame extension 125. The first caster wheel 121 has an axle supported within a wheel fork assembly 20. The wheel fork assembly 20 is attached to a spindle shaft 12 by a washer 28 and nut 30.

In practice, a first hub/bearing assembly (not shown in FIG. 3) would encircle the spindle shaft 12 and rest upon a hub/bearing support 18, which protrudes around the perimeter of the spindle shaft 12 (in FIG. 3). As the spindle shaft 12 is fully inserted into the spindle sleeve 170, the first hub/bearing would engage the underside of an inwardly protruding circular flange within the spindle sleeve 170. A second hub/bearing assembly (not shown in FIG. 3) would then be inserted from the top of the spindle sleeve 170 to encircle the spindle shaft 12 and rest upon the topside of the same inwardly protruding circular flange within the spindle sleeve 170. Such hub/bearing assemblies interacting with the flange within the spindle sleeve 170 are conventional. Finally, the spindle shaft 12 is secured within the spindle sleeve 170 by an upper castle nut 16, which may include optional spring washers for contacting the second hub/bearing assembly.

Figure 3A:
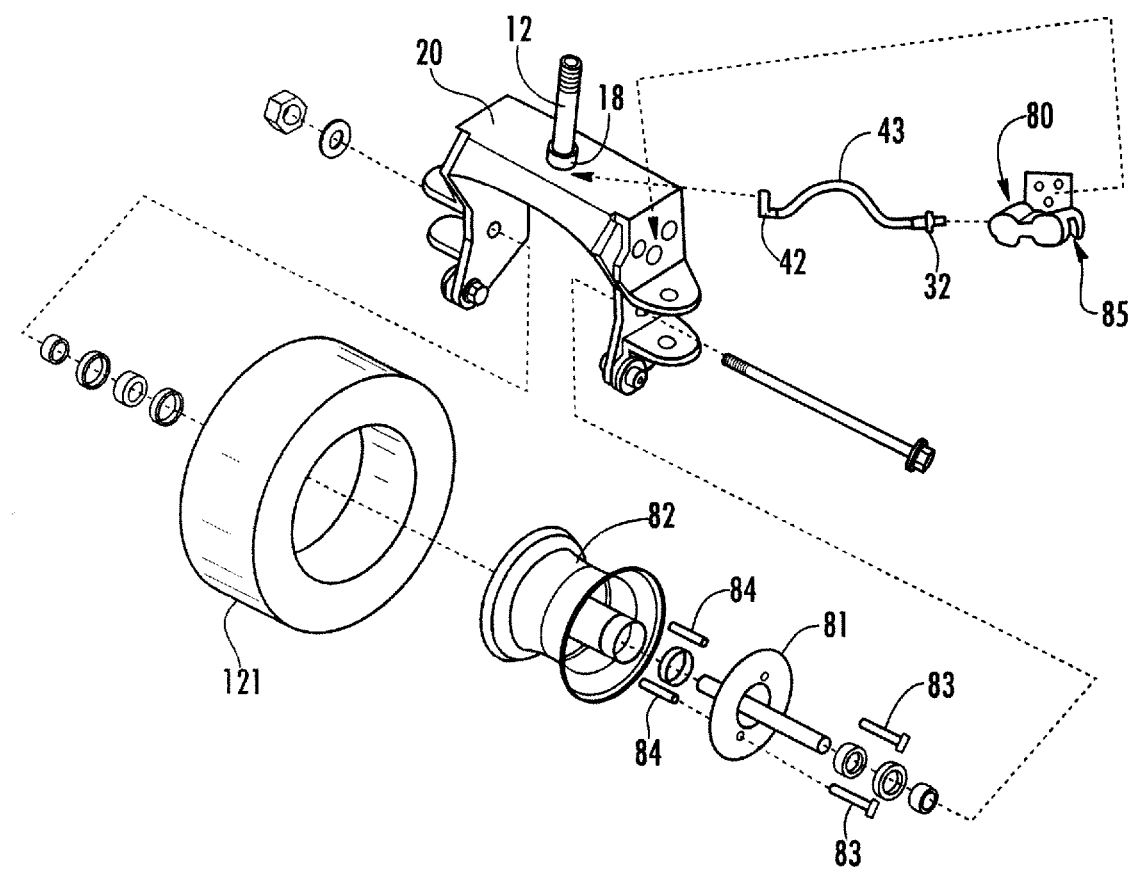
FIG. 3A is an exploded view of a spindle/caster wheel assembly utilizing an alternative disc brake system.
Figure 4:
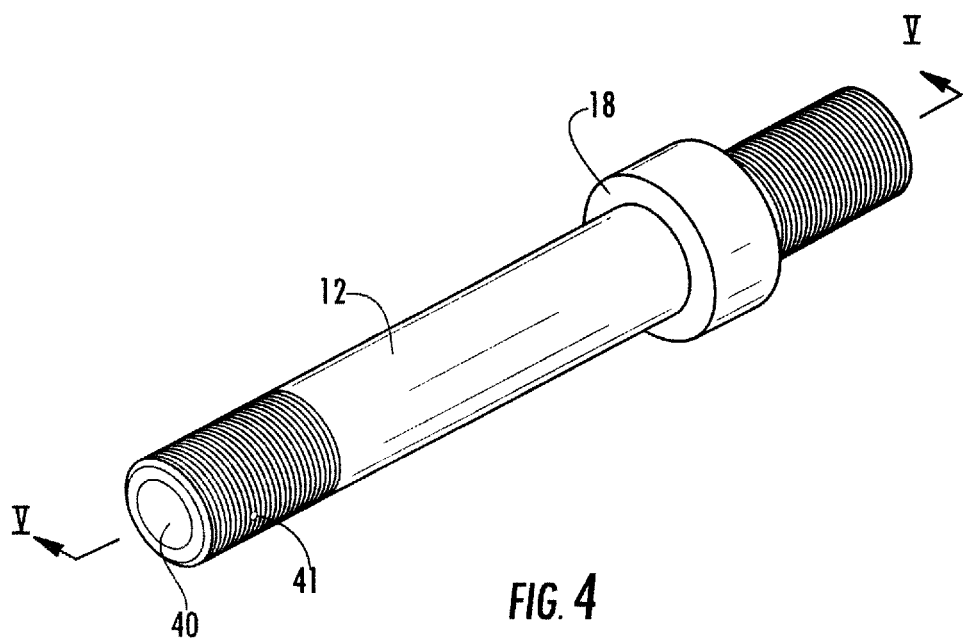
FIG. 4 is a perspective view of a spindle shaft within the spindle/caster wheel assembly of FIGS. 3 and 3A.
Figure 5:
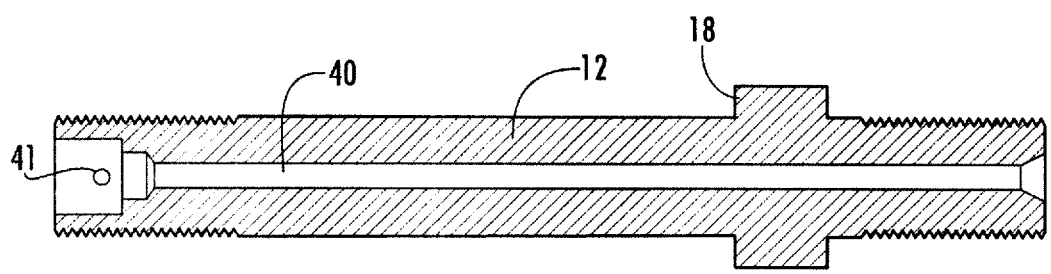
FIG. 5 is a cross sectional view taken along line V-V in FIG. 4.

In accordance with the first embodiment of the present invention, the spindle shaft 12 has a passageway 40 extending from a first end to a second end, as best viewed in FIGS. 4 and 5. An opening to the passageway 40 at the top of the spindle shaft 12 (as viewed in FIG. 3) is attached to a swivel fitting 14. The attachment between the spindle shaft 12 and the swivel fitting 14 may be by any suitable means, such as threaded. Also, the threading near the top end of the spindle shaft 12 may include a through hole 41. A separate fastener may be passed through or engaged within the through hole 41 to further pin the swivel fitting 14 to the top of the spindle shaft 12, providing a primary or supplementary securing force to the connection between the top end of the spindle shaft 12 and the swivel fitting 14.

The swivel fitting 14 permits continual rotation of the top of the spindle shaft 12 (which corresponds to continual rotation of the first caster wheel 121 about the vertical axis of the first spindle 120) to occur without twisting the hose 143, while permitting fluid from the hose 143 to pass into the passageway 40. Such a swivel fitting 14 is known in other arts, but to the knowledge of the Applicant has not been employed in the art of mowers or self-propelled ride-on vehicles having caster wheels. Preferably, the end of the hose 143 is formed of steel and may be anchored to the first frame extension 125 by clamps for stability during any swiveling action of the swivel fitting 14.

At the lower end of the spindle shaft 12, a first fitting 42 is attached. The first fitting 42 permits the fluid in the passageway 40 to enter into a short coupling hose 43 and pass to a second fitting 32. The second fitting 32 is secured to a slave cylinder 24. Depression of the second foot pedal 139 (FIG. 1A) or squeezing of the hand actuator 161 (FIG. 1B) will cause the slave cylinder 24 to press a plunger against a target area 75 on a drag plate 26.

The slave cylinder 24 is rigidly attached to a mounting plate 22. The mounting plate 22 is rigidly attached to the wheel fork assembly 20. A first edge 60 of the mounting plate 22 is attached to a first edge 61 of the drag plate 26 by a hinge 62. A second edge 63 of the mounting plate 22 is attached to a second edge 64 of the drag plate 26 by a spring 65. When pressure is applied to the target area 75 by the plunger of the slave cylinder 24, the drag plate 26 moves away from the mounting plate 22 and engages the tread portion of the first caster wheel 121 to slow or stop rotation of the first caster wheel 121 about its axle. When the plunger is retracted from the target area 75, the spring 65 causes the drag plate 26 to retract toward the mounting plate 22 and disengage from the tread portion of the first caster wheel 121.

The mounting plate 22, hinge 62, spring 65, slave cylinder 24 and drag plate 26 could all be replaced with a disc-type brake assembly, as illustrated in FIG. 3A. In the disc-type braking assembly, the second fitting 32 has been attached to a caliper 80 to supply fluid pressure and move brake pads of the caliper 80. The caliper 80 is rigidly attached inside of the wheel fork assembly 20. A metallic disc 81 is rigidly attached to a hub 82 of the first caster wheel 121 to rotate in unison therewith, such as by bolts 83 and standoffs 84. FIG. 3A also illustrates the axle, bearings, hubs and other conventional component parts, which attach the caster wheel 121 to the wheel fork assembly 20.

During assembly, the disc 81 is placed into a slot 85 in the caliper 80 where it may be engaged by the brake pads. Such a disc brake assembly would operate in the same or similar manner as known disc-brake assemblies for motorcycles, automobiles, etc. It should also be noted that a drum brake assembly could be substituted instead of the disc-type brake assembly of FIG. 3A.

Figure 6:
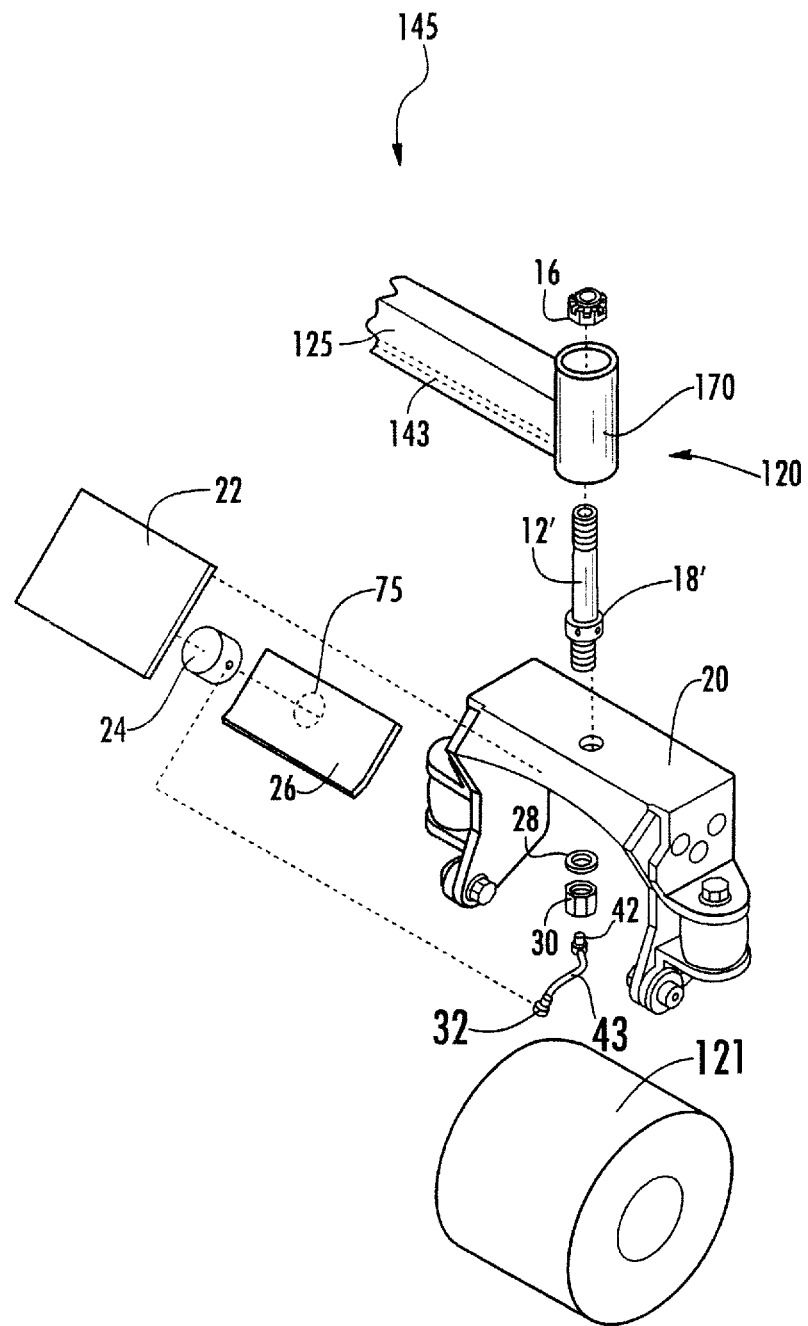
FIG. 6 is an exploded view similar to FIG. 3, but illustrating a spindle/caster wheel assembly constructed in accordance with a second embodiment.

FIG. 6 illustrates an alternative to the swivel fitting 14 of FIGS. 2-3. In second embodiment of the present invention illustrated in FIG. 6, the link 143 (i.e., an oil hose in this embodiment), is located inside of the first frame extension 125. The oil hose terminates to an opening 92 drilled through a sidewall of the spindle sleeve 170 adjacent to the hub/bearing support 18' of the spindle shaft 12', as best seen in FIG. 8.

Figure 7:
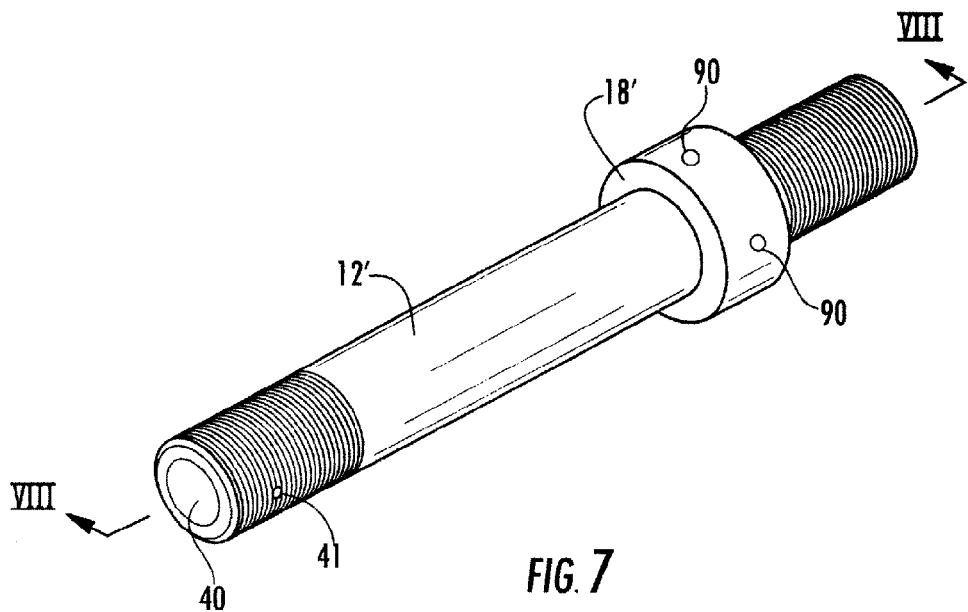
FIG. 7 is a perspective view of a spindle shaft within the spindle/caster wheel assembly of FIG. 6.
Figure 8:
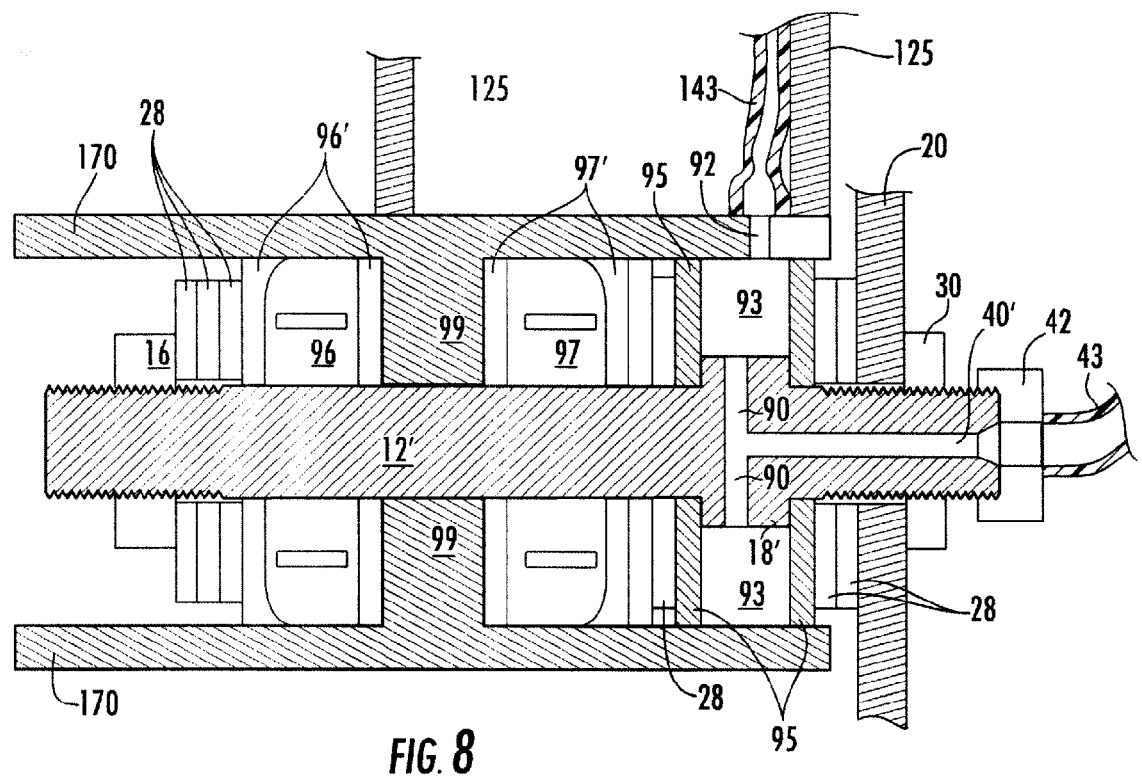
FIG. 8 is a cross sectional view taken along line VIII-VIII in FIG. 7 and additionally illustrating portions of a surrounding spindle sleeve.

As best seen in FIGS. 7 and 8, the passageway 40' no longer extends between the two ends of the spindle shaft 12'. In this alternative, the passageway 40' extends from the lower end of the spindle shaft 12' (as viewed in FIG. 6) to a mid point within the hub/bearing support 18'. A plurality of sub-passageways 90 (such as four sub-passageways 90) extend from the passageway 40' to a circumference of the hub/bearing support 18'.

FIG. 8 now includes a cross sectional view showing the assembly of the spindle shaft 12' in the spindle sleeve 170. A gap 93 exists between the inside sidewall of the spindle sleeve 170 and the hub/bearing support 18'. The small gap 93 allows hydraulic fluid to pass freely from the opening 92 into one or more of the sub-passageways 90 around the circumference of the hub/bearing support 18'. The hydraulic fluid is prevented from escaping into other areas within the spindle sleeve 170 by seals 95 which are immediately adjacent to the top and bottom of the hub/bearing support 18'. The upper seal 95 is below a lower hub 97' and lower bearing assembly 97. In turn, the lower hub 97' and lower bearing assembly 97 are located below the inwardly protruding circular flange 99 of the spindle sleeve 170.

FIG. 8 also illustrates an upper hub 96' and upper bearing assembly 96 located above the inwardly protruding circular flange 99 within the spindle sleeve 170. In FIG. 8, a plurality of spring washers 28 (e.g., three spring washers) is located between the castle nut 16 and the upper hub 96', supporting the upper bearing assembly 96. In practice the upper and lower nuts 16 and 30 would be tightened to sandwich the inwardly protruding circular flange 99 between the upper and lower hub/bearing assemblies 96 and 97 until the spring washers 28 are substantially flat. The embodiment of FIGS. 6-8 has the advantage of removing the link 143 or hydraulic hose from sight and potential damage from foreign objects.

Although the embodiments of FIGS. 1-8 have discussed a link for passing hydraulic fluid, it would be possible have pneumatic brakes instead of hydraulic brakes, while using the embodiments of the present invention. With pneumatic brakes, a store of air pressure would be maintained by a pump upstream of the manual actuator 139 or 161 (FIG. 1A or FIG. 1B). The manual actuator 139 or 161 would activate a first mechanism 141 in the form of a variable pressure value to selectively allow a level of air pressure to be applied to the link 143 (an air hose in this embodiment). The air would pass through the swivel fitting 14 or through the openings 92/90 to enter into the passageway 40 or 40'. The pressurized air would power the second mechanism 145, such as an air-powered plunger to press against the target area 75 of the drag plate 26, or an air-powered caliper to frictionally engage the metallic disc 81.

Also, it would be possible have electric brakes instead of hydraulic brakes, while using the embodiments of the present invention. With electric brakes, a store of voltage, such as a battery, would provide input power to the first mechanism 141, which could take the form of a variable resistor, a control circuit or microprocessor. The manual actuator 139 or 161 would selectively control the first mechanism 141 to allow a level of current or signal to be applied to the link 143 (a wire in this embodiment). The wire would pass through the swivel fitting 14 or through the inner sidewall of the spindle sleeve 170 and the hub/bearing support 18 via brushes and conductive rings, which permit relative rotation while maintaining electrical conductivity. The electrical current or signal would power the second mechanism 145, such as an electrical solenoid-powered plunger to press against the target area 75 of the drag plate 26, or an electrically-operated caliper to frictionally engage the metallic disc 81.

Figure 9:
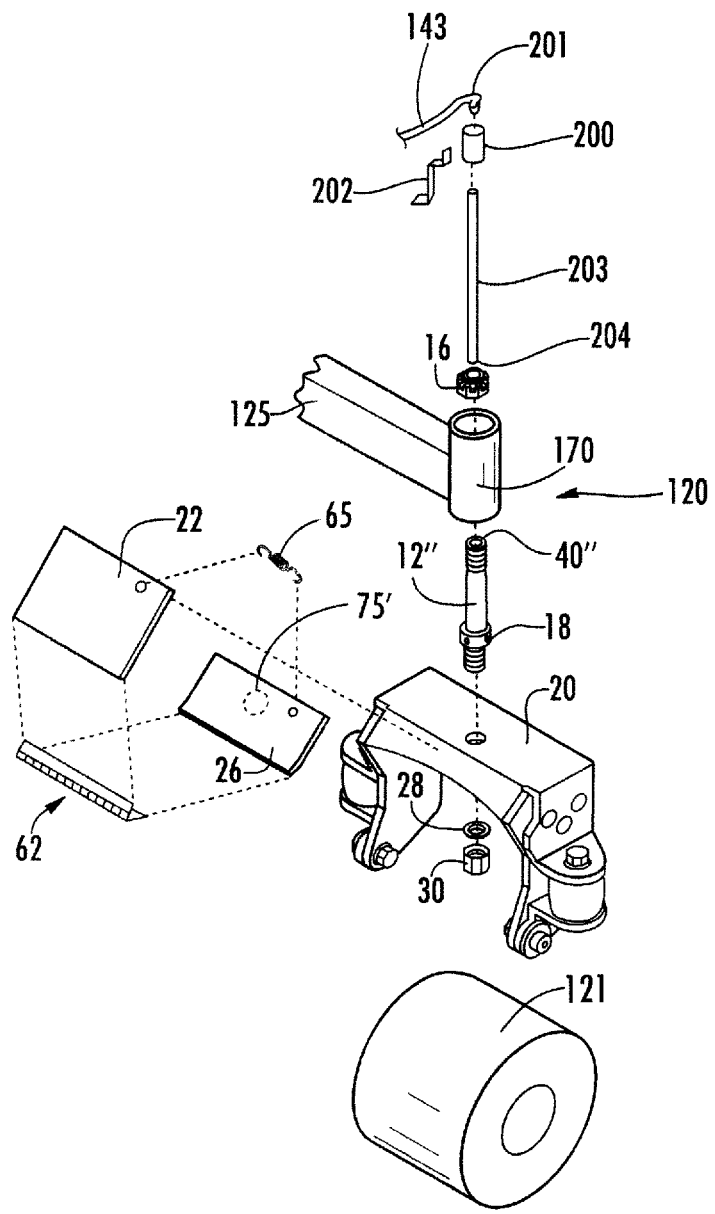
FIG. 9 is an exploded view similar to FIG. 3, but illustrating a spindle/caster wheel assembly constructed in accordance with a third embodiment.

FIG. 9 illustrates another alternative to the swivel fitting 14 of FIGS. 2-3. In the third embodiment of present invention illustrated in FIG. 9, the link 143 (i.e., an oil hose in this embodiment), connects directly to a top slave cylinder 200 via a fitting 201. The top slave cylinder 200 may be rigidly attached to the first frame extension 125 by a bracket 202.

The top slave cylinder 200 is capable of pushing an extended length push rod 203 downward when the hand actuator 139 or 161 is activated by an operator. The extended length push rod 203 may optionally be lifted when the hand actuator 139 or 161 is not activated by a return spring within the top slave cylinder 200.

Figure 10:
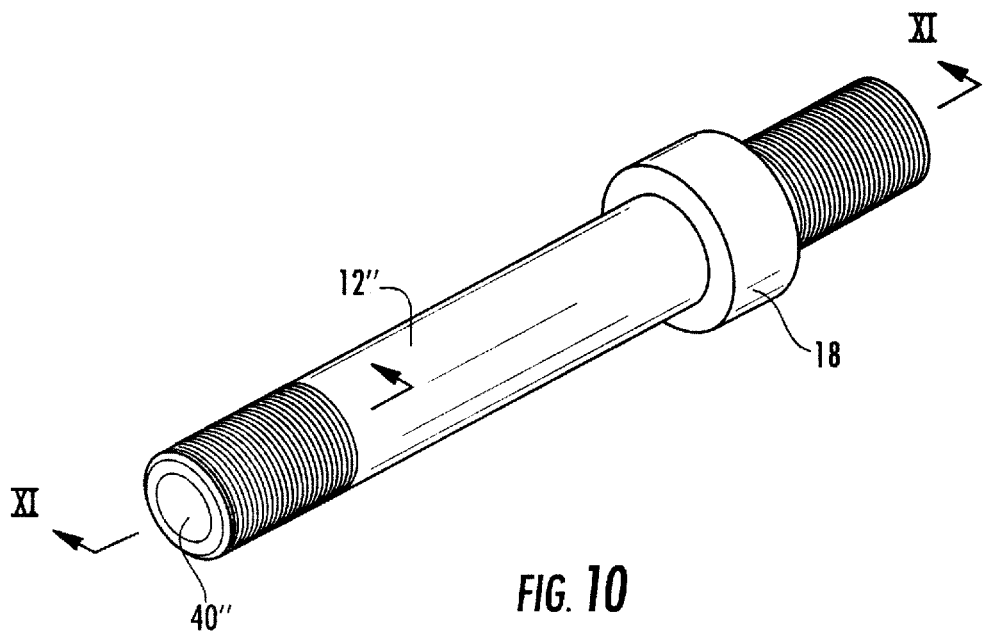
FIG. 10 is a perspective view of a spindle shaft within the spindle/caster wheel assembly of FIG. 9.
Figure 11:
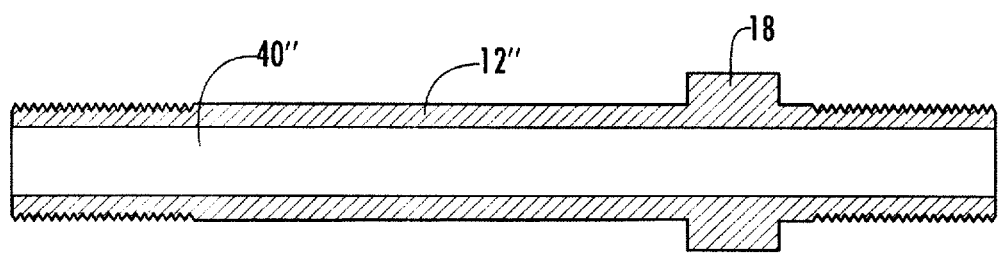
FIG. 11 is a cross sectional view taken along line XI-XI in FIG. 10.

As best seen in FIGS. 10 and 11, the spindle shaft 12" has an oversized passageway 40". A diameter of the oversized passageway 40" is slightly greater than a diameter of the extended length push rod 203. A distal end 204 of the extended length push rod 203 is directed by the orientation of the spindle shaft 12" to contact the target area 75' of the drag plate 26.

When pressure is applied to the target area 75' by the distal end 204 of the extended length push rod 203 by the top slave cylinder 200, the drag plate 26 moves away from the mounting plate 22 and engages the tread portion of the first caster wheel 121 to slow or stop rotation of the first caster wheel 121 about its axle. When the extended length push rod 203 is no longer pressing with a force against the target area 75', the spring 65 causes the drag plate 26 to retract toward the mounting plate 22 and disengage from the tread portion of the first caster wheel 121. Of course, the top slave cylinder 200 could be pneumatically or electrically activated, if desired.

FIGS. 9-11 demonstrate a mechanical manner of transmitting a force through the first spindle 120 for a braking assembly. No swivel coupling is needed at the end of the link 143 to permit rotation in the link 143. Rather, free rotation of the first caster wheel 121 about the vertical axis of the first spindle 120 is enabled because the distal end 204 of the extended length push rod 203 is not connected to the drag plate 26. Rather, the distal end 204 may either spin on the surface of the target area 75' or may be retracted from the target area 75' by a spring within the top slave cylinder 200 or encircling the extended length push rod 203 inside the spindle sleeve 170.

Figure 12:
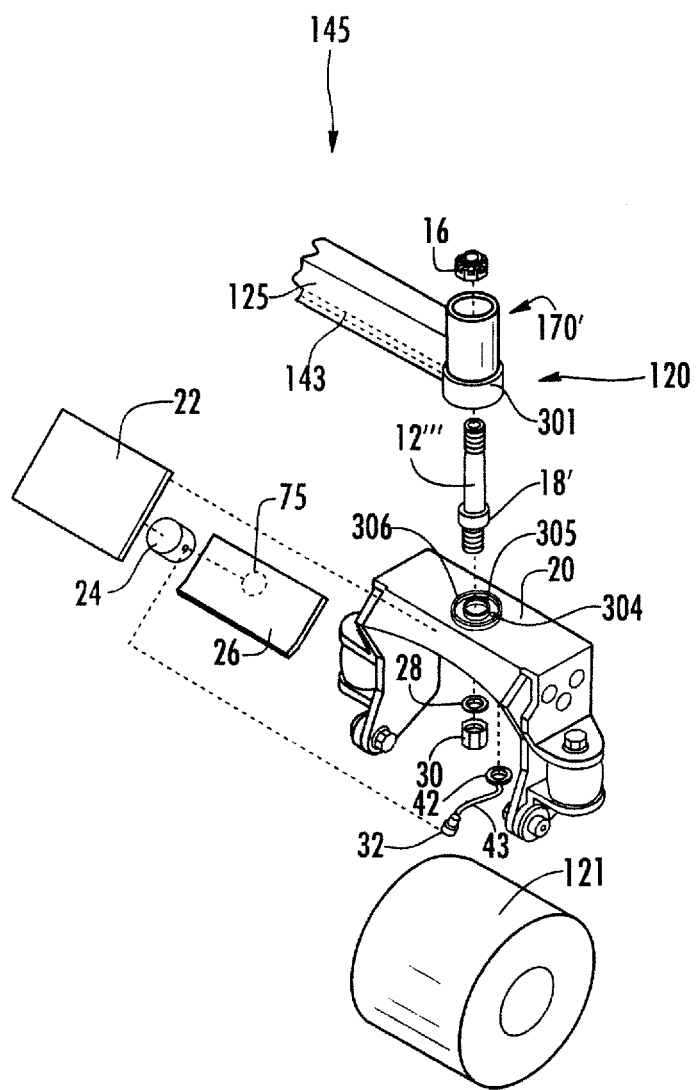
FIG. 12 is an exploded view similar to FIG. 3, but illustrating a spindle/caster wheel assembly constructed in accordance with a fourth embodiment.

All of the above embodiments have demonstrated a path through the spindle 120 via the spindle shaft 12, 12' or 12" to actuate a braking force on the first caster wheel 121. Of course, there could be other paths through the spindle 120, besides through the spindle shaft 12, 12' or 12". For example, FIGS. 12 and 13 illustrate that the spindle sleeve 170' could be double walled, and the path through the spindle 120 to actuate a braking force on the first caster wheel 121 could pass a force between outer and inner walls of the spindle sleeve 170'.

Figure 13:
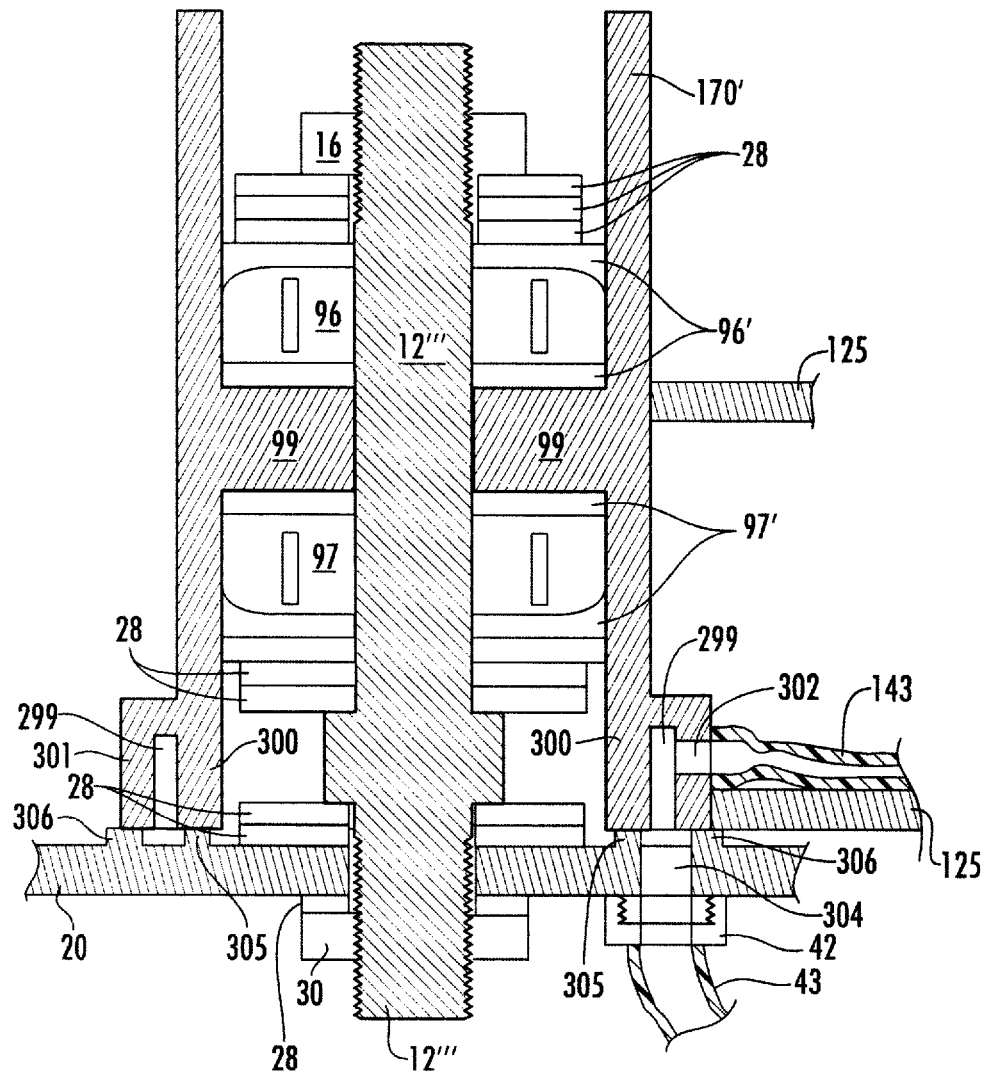
FIG. 13 is a cross sectional view taken through the spindle of FIG. 12.

As best seen in FIG. 13, a double walled spindle sleeve 170' has an inner wall 300 and an outer wall 301. The outer wall 301 has a first opening 302 to accept hydraulic fluid from the link 143. The first opening 302 permits the hydraulic fluid of the link 143 to pressurize an area 299 between the inner wall 300 and the outer wall 301.

A top surface of the wheel fork assembly 20 includes a second opening 304. The second opening 304 is positioned between a first circular seal 305 and a second circular seal 306. The first and second circular seals 305 and 306 are concentric with the opening in the top of the wheel fork assembly 20 for receiving the lower end of the solid, spindle shaft 12'''. The first and second circular seals 305 and 306 seal the top of the wheel fork assembly 20 to the inner and outer walls 300 and 301, respectively, such that hydraulic fluid within the area 299 will pass only through the second opening 304. Hydraulic fluid entering the second opening 304 enters into the short coupling hose 43 via the first fitting 42 passes to the friction applying components of the braking system. Of course, the first and second openings 302 and 304 could pass air pressure instead of hydraulic fluid. Also, in the case of electric brakes an electrical signal could be passed via a wire through the first opening 302 and connected to a conductive brush at the bottom of the area 299 in contact with a conductive circular ring between the first and second seals 305 and 306.

All of the above embodiments have demonstrated the braking system on a zero-turn mower 101. The braking system of the present invention could be used on other types of vehicles, particularly self-propelled vehicles (primarily due to their weight) with front wheels of the caster-style. For example, a ride-on, power scooter, as commonly used by the elderly or disabled.

Tests have shown that the brakes of the present invention when provided on the front caster wheels of a zero-turn mower are highly effective in stopping the zero-turn mower, even the larger zero-turn mowers with a weight exceeding 1,000 pounds, such as commercial zero-turn mowers which typically weigh in the range of 1,500 to 2,500 pounds with a rider. In a first test, a rider was positioned on a seat of a zero-turn mower, where the zero-turn mower and rider's weight combined to about 2,000 pounds. The zero-turn mower was started and the rear drive wheels were held locked against rotation via the drive system.

In the first test, one end of a first cable was attached to the front of the mower's frame. The other end of the first cable was attached to a first side of a weight scale. A second side of the weight scale was attached to a first end of a second cable and the second end of the second cable was attached to a larger tractor. With the rear wheels locked against rotation using the drive system of the zero-turn mower and the front caster wheels freely rotating, the larger tractor was able to slide the rear wheels of the zero-turn mower across a level grassed yard with a weight scale indication of about 860 pounds. When the rider on the zero-turn mower applied the brakes to the front caster wheels, the weight scale indication increased to an excess of 1,500 pounds, hence showing an increase of at least 500 pounds due to the added braking force of the front caster wheels on a level grassed surface.

Of course, the measurements in this first test were influenced by the grass type, grass density and moisture content, as well as the weight distribution of the mower/rider, tire sizes, pressures and tread designs, and other factors. However, the first test illustrates that the front brakes have a significant effect, such as a 50% or greater braking force effect, even on a level grassed surface in an A to B comparison under a same set of circumstances.

In contrast to the level surface of the first test, it is believed that most accidents occur on an inclined surface, when the zero-turn mower is traveling downhill in the forward direction. Under such circumstances, the brakes on the front caster wheels are much more effective at braking the zero-turn mower because more of the weight of the zero-turn mower is shifted to the front caster wheels. For example, in a second test involving a mower/rider combination weighing about 2,000 pounds, it was determined that the front caster wheels supported about 500 pounds (e.g., 510 pounds) and the rear wheels supported about 1,500 pounds (e.g., 1478 pounds), as the zero-turn mower sat on level ground. When the zero-turn mower was inclined to simulate traveling down a twenty-two degree slope, the front caster wheels received significantly more of the mower/rider combination weight, e.g., about a 50% increase in weight load to about 750 pounds (e.g., 757 pounds).

The increased weight distributed onto the front caster wheels during downhill travel translates into improved braking performance at the front caster wheels and reduced braking performance at the rear wheels. Depending upon the slope of the incline, the additional braking force achievable by the front caster wheels could be in the range of 600 to 1,500 pounds of additional braking force over and above the braking force of the rear wheels. Such a significant addition of braking force could mean the difference between stopping the zero-turn mower safely and suffering a death or personal injury to the rider if the front caster wheel brakes were not available.

FIG. 1 illustrated a zero-turn mower having first and second front caster wheels. The benefits of front caster wheel braking could also be employed on a zero-turn mower having only a single front caster wheel, as illustrated in FIG. 14.

Figure 14:
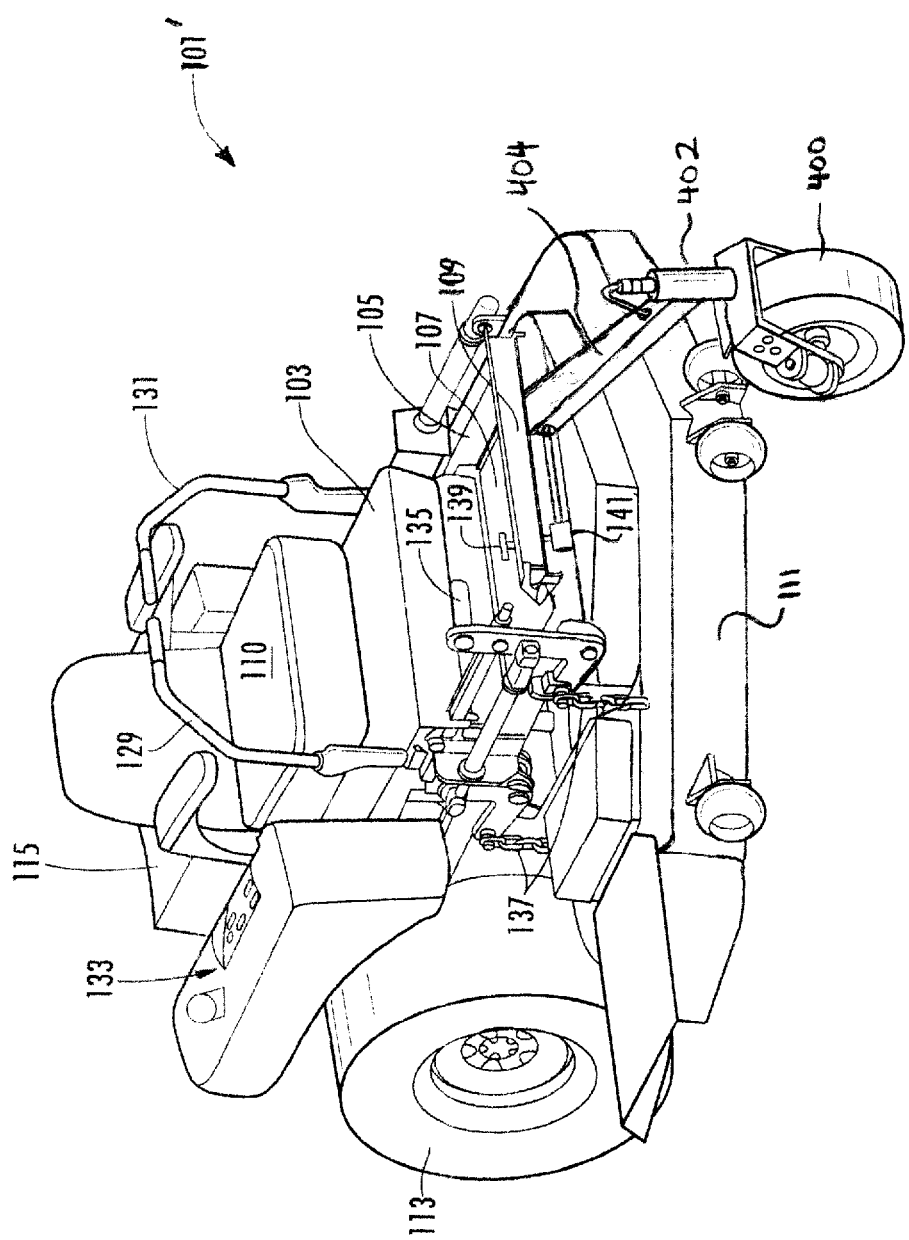
FIG. 14 is a perspective view of a zero-turn mower including a single front caster wheel with a brake system.

FIG. 14 shows a modified zero-turn mower 101' having a single front caster wheel 400. The single front caster wheel 400 is attached to a front portion of the frame via a single spindle 402, at a distal an end of a frame extension 404. The frame extension 404, single spindle 402 and caster wheel 400 may be formed in a same or similar manner to the first frame extension 125, first spindle 120 and first caster wheel 121, described above, except that the frame extension 404 is mounted more in the middle section of the mower's frame, such that the single caster wheel 400 resides in front of the mower 101' along a mid-line of the mower 101' passing through the proximate center of the mower from the front to the back of the mower 101'. Alternatively stated, the single caster wheel 400 is generally centered in front of the mowing deck 111, which may be judged relative to the rider's platform 110 which is located generally centered above or behind the mowing deck 111. Moreover, any of the brake system embodiments described herein may be employed to slow or stop rotation of the single caster wheel 400, such as the hydraulic system depicted in FIG. 14, which has the same or similar components as those depicted and described in relation to FIGS. 1, 1A, 2 and 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A mower comprising:
   a frame;

a rider's platform attached to said frame;

a mowing deck attached to said frame, said mowing deck including blades;

first and second rear wheels attached to said frame;

an engine attached to said frame, said engine having an ability to rotate said rear wheels to impart movement to said mower and having an ability to rotate said blades for cutting grass;

a front caster wheel attached to said frame;

a brake attached to said front caster wheel; and a brake actuator attached to said frame, wherein said brake actuator controls operation of said brake, wherein said brake actuator communicates with said brake via a path which passes through a spindle supporting said front caster wheel, and wherein said brake includes friction applying components to slow or stop rotation of said front caster wheel upon operation of said brake.

2. The mower according to claim 1, wherein said front caster wheel is a first front caster wheel, said spindle is a first spindle, and said brake is a first brake, and further comprising:

a second front caster wheel attached to said frame; and a second brake attached to said second front caster wheel, wherein said brake actuator also controls operation of said second brake, wherein said brake actuator communicates with said second brake via a path which passes through a second spindle supporting said second front caster wheel, and wherein said second brake includes friction applying components to slow or stop rotation of said second front caster wheel upon operation of said second brake.

3. The mower according to claim 1, wherein said front caster wheel is the only caster wheel attached to said mower.

4. The mower according to claim 1, wherein said front caster wheel resides generally centered in front of said mowing deck.

* * * * *